US010681875B2

(12) United States Patent
Klein et al.

(10) Patent No.: US 10,681,875 B2
(45) Date of Patent: Jun. 16, 2020

(54) HYDROPONIC TOWER COMPATIBLE GUTTER ASSEMBLY

(71) Applicant: MJNN, LLC, South San Francisco, CA (US)

(72) Inventors: Brice Klein, San Francisco, CA (US); Alex Ibrahim, Pacifica, CA (US); Teryl Chapel, Pacifica, CA (US)

(73) Assignee: MJNN, LLC, South San Francisco, CA (US)

( * ) Notice: Subject to any disclaimer, the term of this patent is extended or adjusted under 35 U.S.C. 154(b) by 290 days.

(21) Appl. No.: 15/943,371

(22) Filed: Apr. 2, 2018

(65) Prior Publication Data
US 2019/0297787 A1 Oct. 3, 2019

(51) Int. Cl.
A01G 31/02 (2006.01)
A01G 9/04 (2006.01)
A01G 9/24 (2006.01)
A01G 9/02 (2018.01)

(52) U.S. Cl.
CPC ............. A01G 9/047 (2013.01); A01G 9/022 (2013.01); A01G 9/247 (2013.01); A01G 31/02 (2013.01)

(58) Field of Classification Search
CPC ........ A01G 9/047; A01G 9/247; A01G 27/00; A01G 31/02
USPC ........................ 47/39, 59 R, 65.6; 405/43, 48
See application file for complete search history.

(56) References Cited

U.S. PATENT DOCUMENTS

| 2,153,790 | A | * | 4/1939 | Carswell | E02B 11/005 405/48 |
| 4,310,990 | A | * | 1/1982 | Payne | A01G 31/02 47/59 R |
| 4,397,114 | A | * | 8/1983 | Skaife | A01G 9/02 47/62 C |
| 4,630,394 | A | * | 12/1986 | Sherard | A01G 31/02 47/59 R |
| 4,669,217 | A | * | 6/1987 | Fraze | A01G 31/02 47/64 |
| 5,010,686 | A | * | 4/1991 | Rivest | A01G 31/02 47/62 C |
| 5,394,647 | A | * | 3/1995 | Blackford, Jr. | A01G 31/02 47/59 R |
| 7,176,024 | B2 | * | 2/2007 | Branson | C12M 21/02 435/292.1 |
| 9,144,206 | B1 | * | 9/2015 | Rubanenko | A01G 31/02 |
| 10,477,786 | B1 | * | 11/2019 | Wilson | A01G 9/045 |
| 10,602,674 | B2 | * | 3/2020 | Storey | A01G 24/00 |
| 2002/0164209 | A1 | * | 11/2002 | Allard | B01D 29/27 405/36 |
| 2005/0100409 | A1 | * | 5/2005 | Houck | E02B 11/005 405/43 |
| 2006/0150482 | A1 | * | 7/2006 | Delisse | A01G 31/02 47/39 |

(Continued)

Primary Examiner — Peter M Poon
Assistant Examiner — Danielle A Clerkley
(74) Attorney, Agent, or Firm — Patent Law Office of David G. Beck

(57) ABSTRACT

A gutter assembly is provided that is configured to collect water passing through a plurality of vertical hydroponic towers, the assembly minimizing leakage while simplifying gutter maintenance. The gutter assembly includes a gutter pipe from which an upper portion has been removed to form a pair of mounting ledges. The gutter assembly also includes a gutter cap that is attached to the gutter pipe via the mounting ledges using a snap fit system.

16 Claims, 5 Drawing Sheets

(56) References Cited

U.S. PATENT DOCUMENTS

| | | | |
|---|---|---|---|
| 2013/0202358 A1* | 8/2013 | Archipley | A01G 9/047 |
| | | | 405/126 |
| 2015/0068121 A1* | 3/2015 | Probst | A01G 31/06 |
| | | | 47/59 R |
| 2015/0082696 A1* | 3/2015 | Barendregt | A01G 9/047 |
| | | | 47/66.7 |
| 2015/0223418 A1* | 8/2015 | Collins | A01G 31/02 |
| | | | 47/62 R |
| 2017/0181393 A1* | 6/2017 | Nelson | A01G 9/023 |
| 2017/0332568 A1* | 11/2017 | Storey | A01G 9/047 |

* cited by examiner

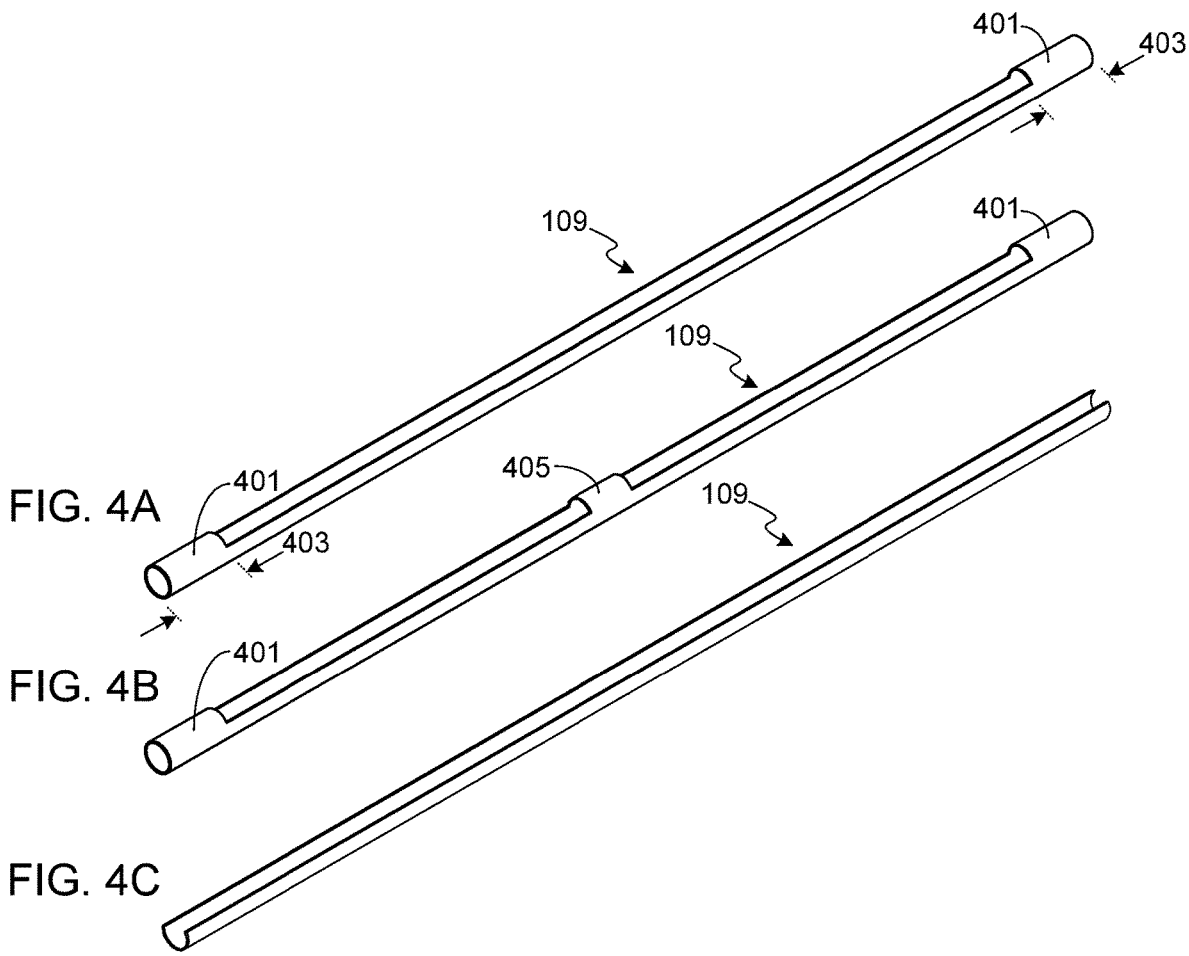
FIG. 4A
FIG. 4B
FIG. 4C
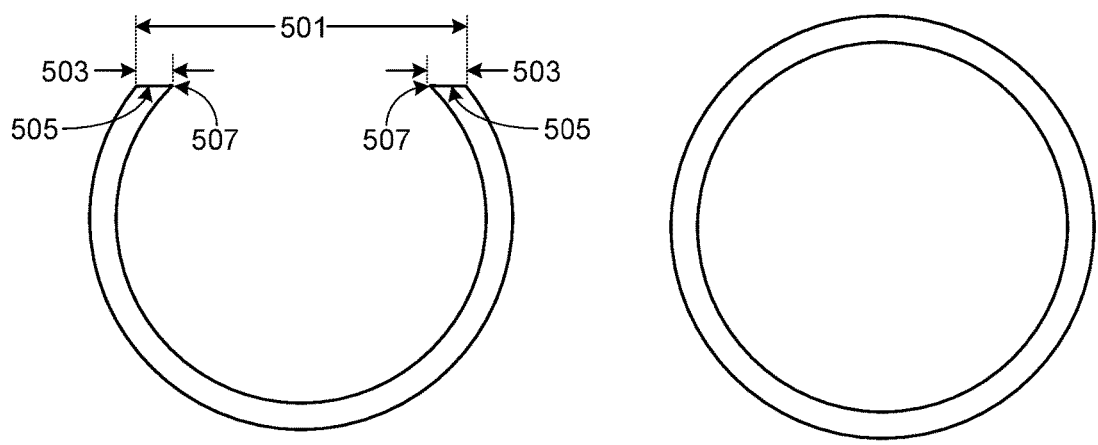
FIG. 5
FIG. 6

HYDROPONIC TOWER COMPATIBLE GUTTER ASSEMBLY

FIELD OF THE INVENTION

The present invention relates generally to hydroponic growing systems and, more particularly, to a gutter assembly that is configured for use with vertical hydroponic towers.

BACKGROUND OF THE INVENTION

The continued growth of the world's population is increasingly taxing the ability of conventional farms to adequately feed everyone. In an attempt to ease this crisis, in recent decades there has been an increased use of pesticides and fertilizers. Unfortunately this dependence on pesticides and fertilizers has exacerbated the problem, leading to regions that are less favorable to farming and, in some instances, creating dead zones in waterways that are subject to runoff.

Since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor and nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a low cost gutter assembly for use with vertical hydroponic towers, the assembly minimizing leakage while simplifying gutter maintenance.

SUMMARY OF THE INVENTION

The present invention provides a gutter assembly that is configured to collect water passing through a plurality of vertical hydroponic towers. The gutter assembly includes a gutter pipe and a gutter cap. An upper portion of a section of the gutter pipe is removed to form a pair of mounting ledges with each mounting ledge comprised of a pipe wall edge. The gutter cap, which is configured to rest on the mounting ledges, includes (i) a plurality of apertures located within an upper surface of the gutter cap, the plurality of apertures configured to accept the plurality of vertical hydroponic towers, and (ii) a fastening system configured to attach the gutter cap to the section of gutter pipe.

In one aspect of the invention, the fastening system may be comprised of a snap fit mechanism. The snap fit mechanism may include a pair of inner arm members and a pair of outer nub members, where a first pipe wall edge corresponding to one of the mounting ledges is captured between a first inner arm member and a first outer nub member and where a second pipe wall edge corresponding to the other mounting ledge is captured between a second inner arm member and a second outer nub member when the gutter cap is attached to the gutter pipe. Each inner arm member may be comprised of an upper arm section and a lower arm section. The radius of curvature of a curvilinear outer surface of each upper arm section of each inner arm member may be equivalent to the radius of curvature of the gutter pipe. The upper arm section of each inner arm member may be set at an angle of approximately 30 degrees relative to a corresponding gutter cap mounting surface, where the gutter cap mounting surfaces rest on the gutter pipe mounting ledges when the gutter cap is attached to the gutter pipe. The lower arm section of each inner arm member may be angled inwards, e.g., at an angle of approximately 20 degrees relative to vertical.

In another aspect, the gutter pipe may be fabricated from a plastic material selected from the group consisting of polyethylene, polypropylene, polyvinyl chloride, polytetrafluoroethylene, and acrylonitrile butadiene styrene. The plastic material forming the gutter pipe may be opaque and/or white.

In another aspect, the gutter cap may be fabricated from a plastic material selected from the group consisting of polyethylene, polypropylene, polyvinyl chloride, polytetrafluoroethylene, and acrylonitrile butadiene styrene. The plastic material forming the gutter cap may be opaque and/or white.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 4A provides a perspective view of a preferred embodiment of the gutter pipe used in the gutter assembly of the invention;

FIG. 4B provides a perspective view of an alternate embodiment of the gutter pipe that includes additional un-machined sections of pipe;

FIG. 4C provides a perspective view of an alternate embodiment of the gutter pipe that does not include any un-machined sections of pipe;

FIG. 5 provides a cross-sectional view of the machined portion of the gutter pipe shown in FIGS. 4A-4C;

FIG. 6 provides a cross-sectional view of the un-machined portions of the gutter pipe shown in FIGS. 4A and 4B;

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
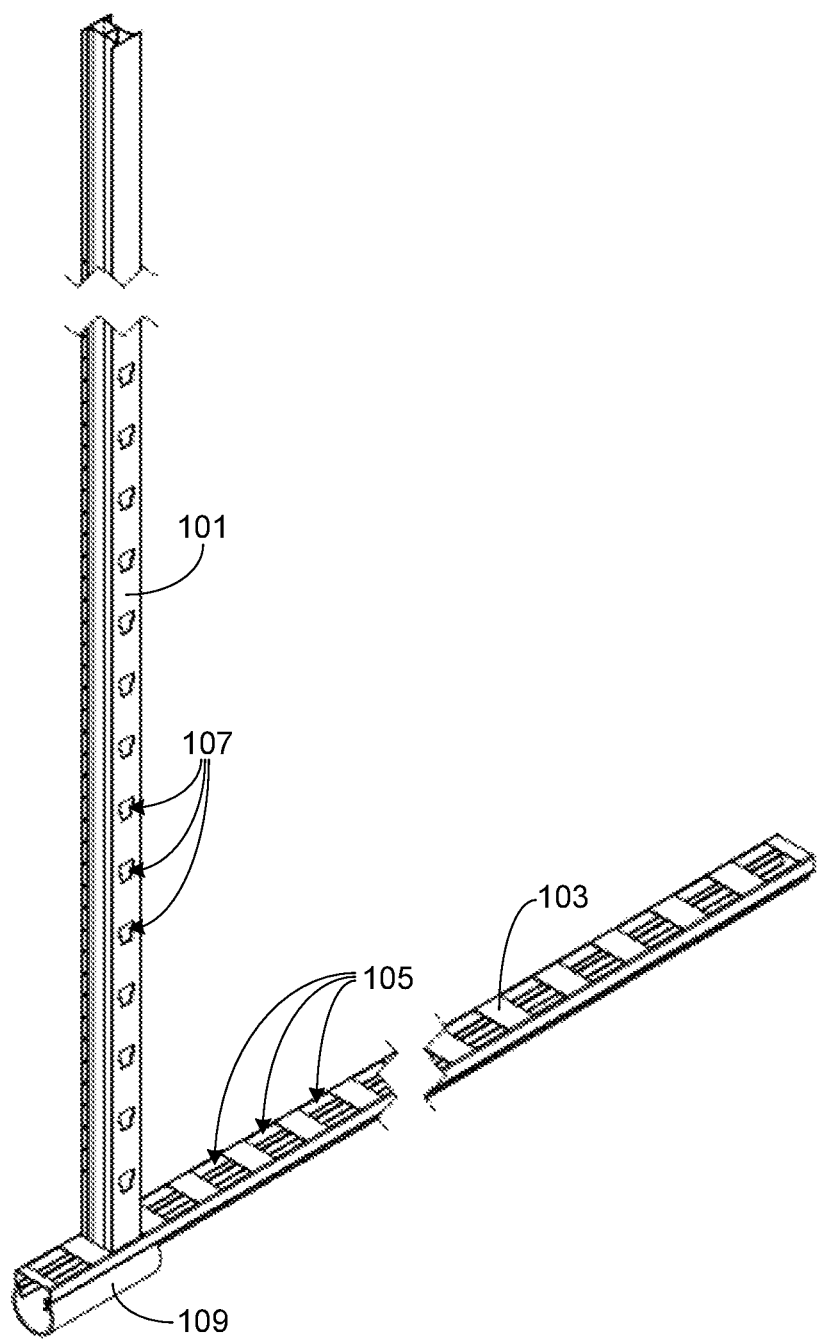
FIG. 1 provides a perspective view of a hydroponic tower assembly in accordance with the invention.
Figure 2:
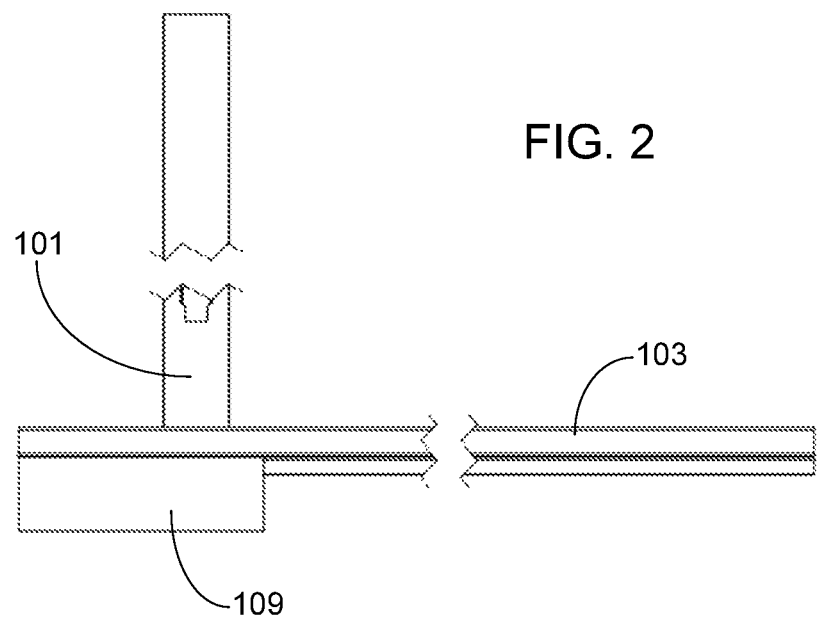
FIG. 2 provides a side view of the assembly shown in FIG. 1.
Figure 3:
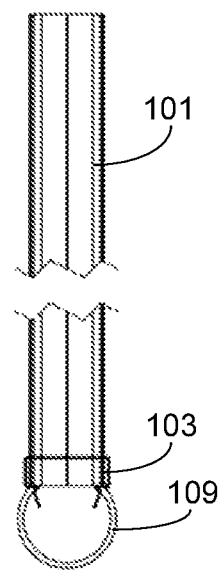
FIG. 3 provides an end view of the assembly shown in FIGS. 1 and 2.

FIG. 1 provides a perspective view of a portion of a hydroponic tower assembly fabricated in accordance with the preferred embodiment of the invention. FIGS. 2 and 3 provide side and end views, respectively, of the assembly shown in FIG. 1.

In the assembly illustrated in FIGS. 1-3, a single tower 101 is shown inserted into gutter cap 103. It will be appreciated that the apertures 105 within gutter cap 103 can be sized to accommodate a variety of tower designs and configurations. In the illustrated embodiment, however, tower 101 utilizes a dual-face, multi-piece design such as that disclosed in co-assigned and co-pending U.S. patent application Ser. No. 15/910,601, filed 2 Mar. 2018, the disclosure of which is incorporated herein for any and all purposes. While the gutter assembly of the invention is not limited to a particular tower or plant holder, in the illustrated embodiment the tower includes a plurality of cut-outs 107 into which plant holders may be inserted. Cut-outs 107 can be punched out, machined (e.g., utilizing a computer numerical control (CNC) machine), or otherwise fabricated into the tower face. Any of a variety of materials can be used in the manufacture of the tower, although preferably the tower is fabricated from plastic (e.g., polyethylene, polypropylene, polyvinyl chloride (PVC), polytetrafluoroethylene, acrylonitrile butadiene styrene (ABS), etc.), and more preferably from an opaque PVC that is colored white. Using an opaque PVC material that prevents light from entering the tower helps to minimize algae blooms while the white coloring increases the amount of light reflected back onto the plants. Exemplary plant holders are disclosed in co-assigned and co-pending U.S. patent application Ser. No. 15/910,445, filed 2 Mar. 2018, and Ser. No. 15/910,796, filed 2 Mar. 2018, the disclosures of which are incorporated herein for any and all purposes. It should be understood that the gutter assembly of the present invention can also be used with towers utilizing matrix media/wicking strips and plant inserts configured for use with such towers, an exemplary configuration of which is disclosed in co-assigned and co-pending U.S. patent application Ser. No. 15/910,308, filed 2 Mar. 2018, the disclosure of which is incorporated herein for any and all purposes.

The gutter assembly of the invention includes a gutter pipe 109 as well as gutter cap 103. In FIGS. 1-3, only a small section of pipe 109 is shown. It should be understood, however, that in use pipe 109 extends under the entire length of gutter cap 103, thus insuring that the water/nutrient mix flowing into the pipe from the attached hydroponic towers is properly captured for removal and/or recycling.

Although gutter pipe 109 may be extruded to match the exact desired configuration, the inventors have found that a more cost effective approach is to use conventional pipe and machine the pipe to meet the needs of the gutter assembly. While pipe 109 can be manufactured from a variety of materials, preferably it is manufactured from plastic, and more preferably from an opaque PVC plastic that is colored white, thereby minimizing algae blooms within the gutter while increasing the amount of light reflected back onto the plants.

FIGS. 4A-4C illustrate three configurations for pipe 109. In the preferred embodiment, pipe 109 is fabricated from a Schedule 40, 4 inch PVC pipe. The top of the pipe is machined off leaving a flat surface on both sides of the pipe. FIG. 5 provides a cross-section of the pipe after machining while FIG. 6 provides a cross-section of the pipe before machining. In the illustrated embodiment, after machining the width 501 between the outer edges of the machined surfaces is 3.415 inches. Assuming a 0.25 inch pipe wall thickness as preferred, the width 503 of each ledge 505 is approximately 0.35 inches.

Preferably and as illustrated in FIG. 4A, a section 401 at either end of pipe 109 is left un-machined. The length 403 of each section 401 is preferably 2 inches, although it may be shorter or longer as desired. Leaving a section 401 un-machined at either end serves several purposes. First, it allows standard, water-tight pipe fittings to be used to (i) couple sections of gutter pipe 109 together, (ii) easily and effectively seal pipe ends, and (iii) couple recycling piping to the gutter pipes. Second, maintaining a continuous section 401 of un-machined pipe at either end of pipe 109 helps to prevent the pipe from collapsing upon itself after machining. If necessary, for example due to an extremely long section of piping, one or more portions 405 of pipe 109 can be left un-machined as shown in FIG. 4B, where section(s) 405 is located between tower groups. FIG. 4C illustrates a pipe 109 that does not include either sections 401 or 405.

Figure 7:
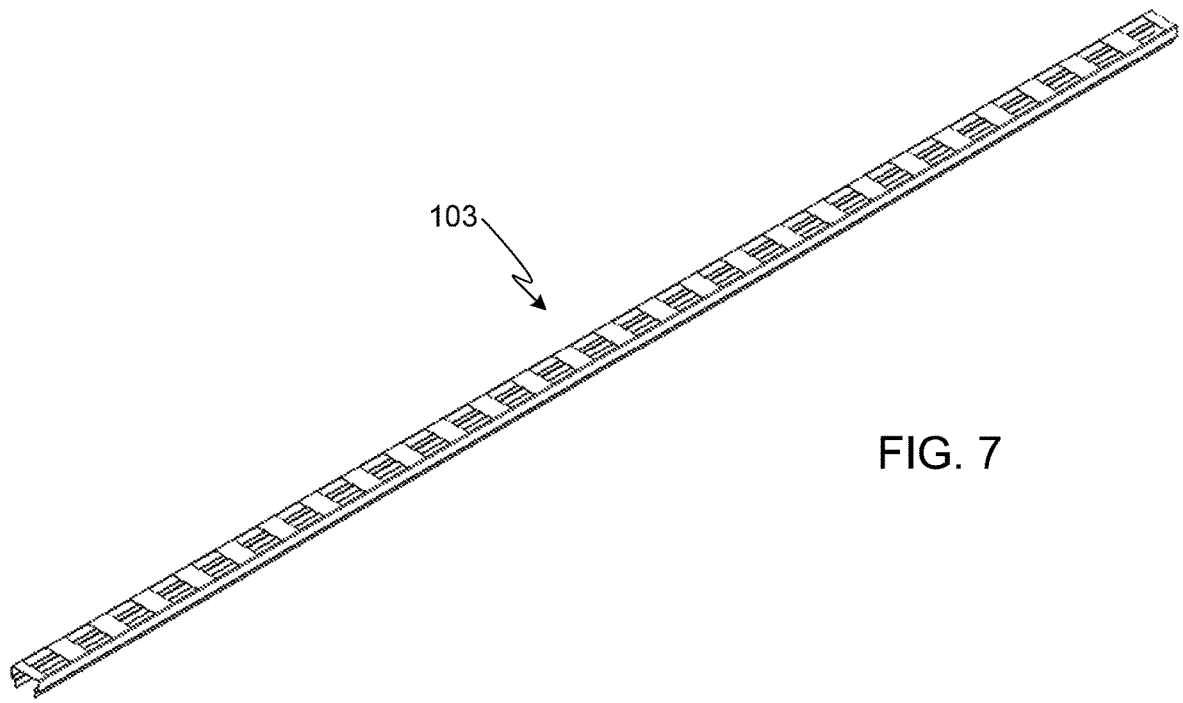
FIG. 7 provides a perspective view of a gutter cap for use with a gutter pipe such as those shown in FIGS. 4A-4C.
Figure 8:
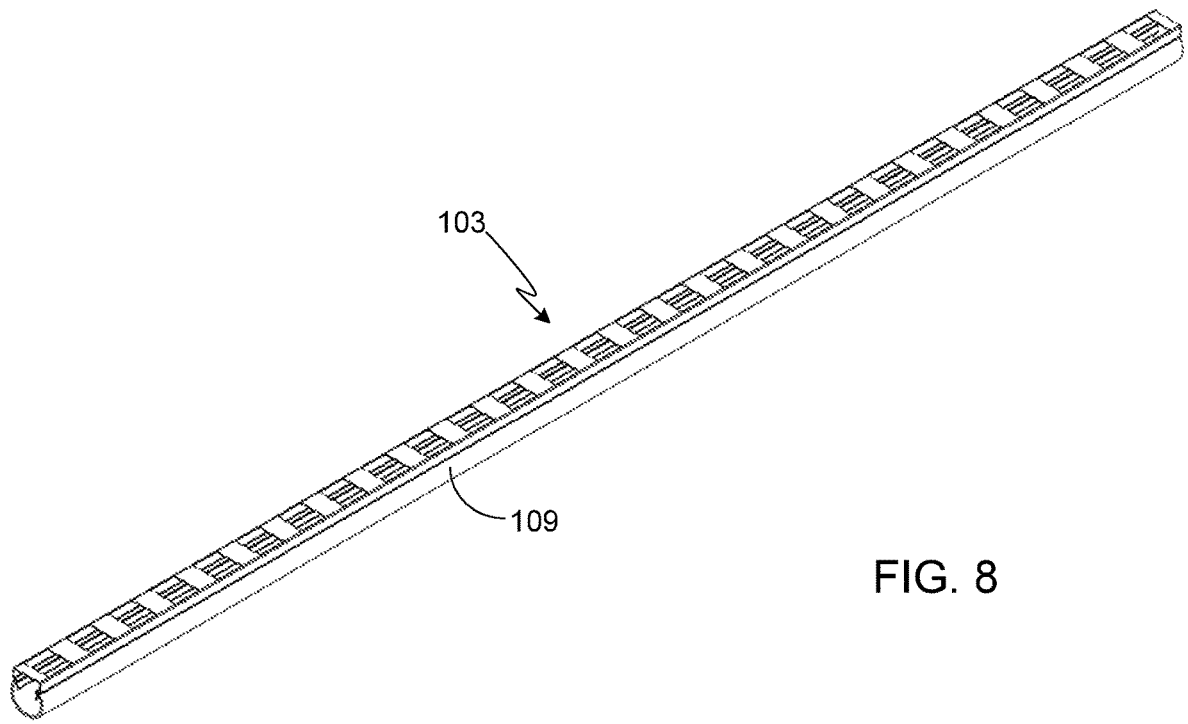
FIG. 8 provides a perspective view of the gutter cap shown in FIG. 7 after attachment to a gutter pipe.

FIG. 7 provides a perspective view of a gutter cap 103. FIG. 8 provides a perspective view of the gutter cap shown in FIG. 7 after attachment to a pipe 109. Note that in this illustration, gutter pipe 109 does not include either end sections 401 or sections 405.

Figure 9:
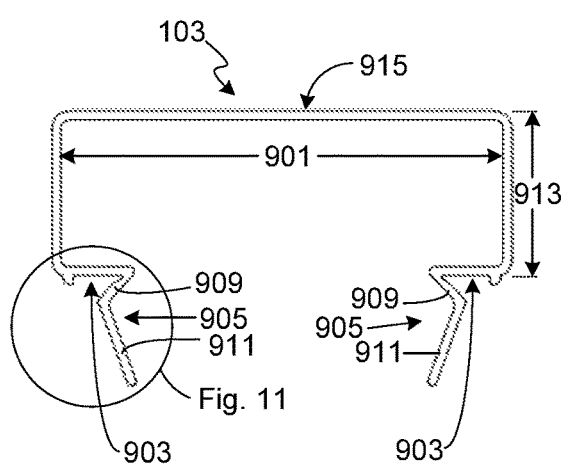
FIG. 9 provides a cross-sectional view of the gutter cap shown in FIGS. 7 and 8.
Figure 10:
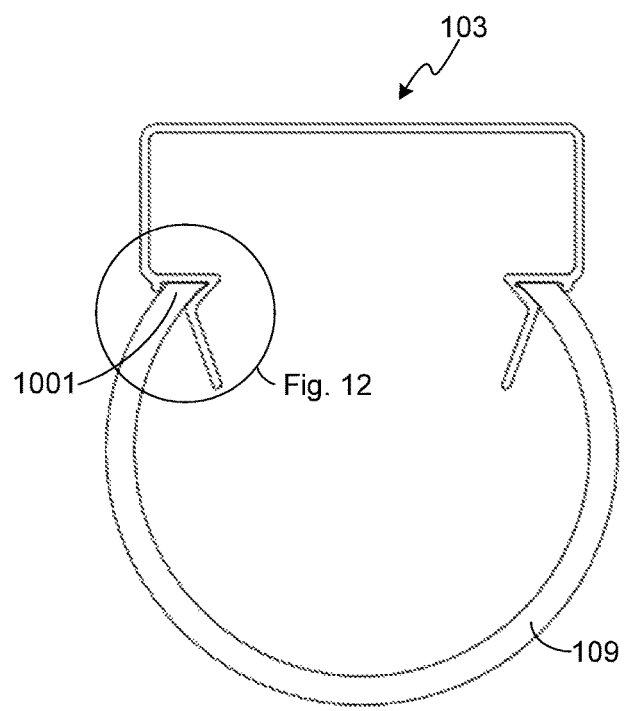
FIG. 10 provides the same cross-sectional view as shown in FIG. 9 after the gutter cap has been attached to the gutter pipe.
Figure 11:
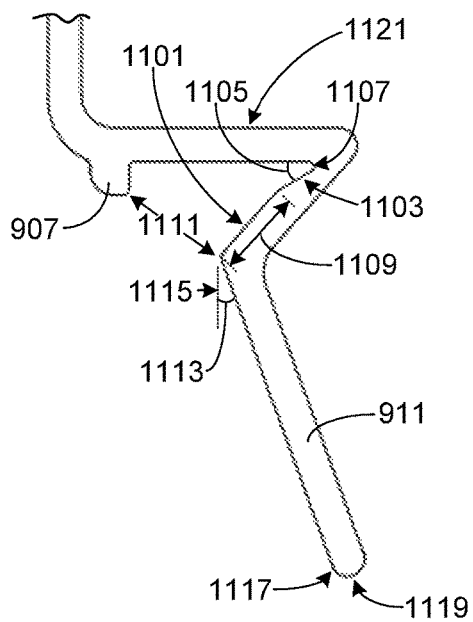
FIG. 11 provides a detailed cross-sectional view of a portion of the gutter cap prior to attachment to the gutter pipe.

FIG. 9 provides a cross-sectional view of gutter cap 103, while FIG. 10 provides the same cross-sectional view after the gutter cap has been attached to pipe 109. Gutter cap 103 is preferably extruded from an opaque, white plastic material such as ABS or PVC, opaque material being preferred to inhibit algae blooms and white coloring being preferred to reflect light back onto the plants. Preferably the wall thickness of the gutter cap is 0.075 inches.

In the preferred embodiment, the inner width 901 of gutter cap 103 is approximately 3.74 inches. Surfaces 903 are configured to lie flat against the ledge surfaces 505 of the machined pipe 109 when the gutter cap is in place as shown in the detailed cross-sectional view provided by FIG. 12.

To insure that the gutter cap remains in place, it locks onto pipe 109 using a snap fit. The snap fit is accomplished using a pair of inner arm members 905 and a pair of outer nubs 907 configured to capture the end portions 1001 of the machined gutter pipe 109. Each inner arm member 905 includes an upper arm section 909 and a lower arm section 911. The outer surface 1101 of upper arm section 909 is preferably curved with a radius of curvature equivalent to, or approximately equivalent to, the radius of curvature of gutter pipe 109. Once pipe portions 1001 are snapped into the gutter cap, upper arm sections 909 lock against the inner surface 1003 of pipe portions 1001. Note that in the preferred configuration, the outer surface of upper arm section 909 includes a lower portion 1101 that is curved as noted above, and an upper portion 1103 that is linear. The upper portion 1103 is angled relative to surface 903 at an angle 1105 of approximately 30 degrees. As a result, a gap 1201 is formed between the end of pipe portion 1001 and the innermost edge of the gutter cap, thus providing a tolerance relief to insure that the gutter cap can be properly mated to the gutter pipe. Preferably and as illustrated, a fillet 1107 (e.g., a 0.012 inch radius fillet) is fabricated at the corner formed by flat ledge surface 903 and the upper portion 1103 of upper arm section 909, thereby providing stress relief for inner arm member 905 when bent.

In the preferred embodiment, outer surface 1101 of upper arm section 909 has a width 1109 of approximately 0.15 inches. The inventors have found that this width provides a sufficient interface between the gutter pipe and the gutter cap without making assembly excessively difficult. It will be appreciated that if width 1109 is too great, arms 905 must be deflected further than desired during assembly, thus requiring greater insertion force and increasing the likelihood of arm failure.

Outer nubs 907 straddle the wall of the pipe, resting against outer pipe surface 1203 when the gutter cap is in place and locked onto the gutter pipe. Preferably the distance 1111 between the outer nubs 907 and the adjacent surface 1101 of upper arm section 909 is slightly smaller than the thickness of the wall of pipe 109, thereby creating a stronger snap when the gutter gap is locked onto the gutter pipe while inhibiting shearing between the two parts when they are slid along their longitudinal axes.

Figure 12:
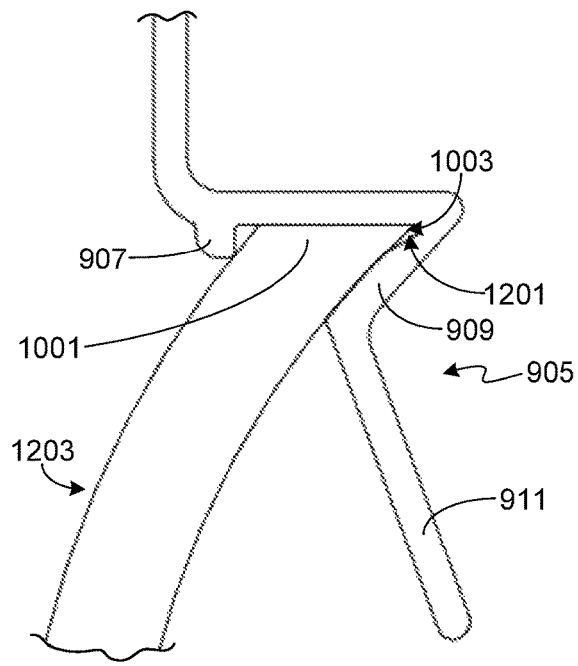
FIG. 12 provides a detailed cross-sectional view of a portion of the gutter cap after attachment to the gutter pipe.

Since the pipe is machined off at a location higher than the mid-point of the pipe, the walls of the pipe curve inward at the attachment point of the gutter gap (see FIGS. 5, 10 and 12). Accordingly, the lower arm section 911 of each arm member 905 is angled inwards, thereby helping to initiate arm member deflection when mounting the gutter gap 103 to the gutter pipe 109. Preferably angle 1113, measured between lower arm section 911 and vertical 1115, is approximately 20 degrees. The lowermost inner edge 1117 of lower arm section 911 is preferably inset from inner ledge edge 507 by approximately 0.075 inches. These dimensions allow the gutter cap arms 905 to be easily inserted into the machined opening of the gutter pipe while still insuring that once the two components are locked together, flow through the gutter pipe is not inhibited. Preferably the end surface 1119 of each arm 905 is rounded to further aid assembly.

As previously noted, the gutter cap 103 includes a plurality of apertures 105 that are sized to accommodate and match the ends of the selected vertical towers 101. Preferably apertures 105 are closely sized to the ends of the vertical towers, thus helping to prevent unwanted movement, either of a translational or rotational nature, of the inserted towers. Additionally, by closely matching the apertures 105 to the outer profile of the towers, light entering the gutter is minimized, which in turn helps to minimize algae growth within the gutter pipe. Apertures 105 can be fabricated using any of a variety of techniques (e.g., punching during cap extrusion, machining, etc.). The height 913 of the gutter cap is driven by the size of the tower and the desired depth of the tower within the gutter assembly. Preferably, and as shown in the cross-sectional view of FIG. 3, when the tower is inserted into the gutter cap the tower edges are substantially aligned with cap ledge surfaces 903 and with the pipe machined edges. If desired, surface 1121 may be sloped slightly downwards towards the pipe, thus preventing water from accumulating on the ledges.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A gutter assembly configured for use with a plurality of vertical hydroponic towers, said gutter assembly configured to collect water flowing through said plurality of vertical hydroponic towers, said gutter assembly comprising:
    a gutter pipe, wherein an upper portion of a section of said gutter pipe is removed to form a pair of mounting ledges, a first mounting ledge of said pair of mounting ledges comprised of a first pipe wall edge and a second mounting ledge of said pair of mounting ledges comprised of a second pipe wall edge; and
    a gutter cap configured to rest on said pair of mounting ledges, said gutter cap comprising:
        a plurality of apertures located within an upper surface of said gutter cap, said plurality of apertures configured to accept said plurality of vertical hydroponic towers; and
        a fastening system configured to attach said gutter cap to said pair of mounting ledges of said section of said gutter pipe, said fastening system comprising a snap fit mechanism formed on a lower portion of said gutter cap, said snap fit mechanism further comprising a pair of inner arm members and a pair of outer nub members, said first pipe wall edge captured between a first inner arm member of said pair of inner arm members and a first outer nub member of said pair of outer nub members when said gutter cap is attached to said gutter pipe, and said second pipe wall edge captured between a second inner arm member of said pair of inner arm members and a second outer nub member of said pair of outer nub members when said gutter cap is attached to said gutter pipe.

2. The gutter assembly of claim 1, said first inner arm member comprising a first upper arm section and a first lower arm section, and said second inner arm member comprising a second upper arm section and a second lower arm section.

3. The gutter assembly of claim 2, wherein a first radius of curvature of a first curvilinear outer surface corresponding to said first upper arm section is equivalent to a second radius of curvature corresponding to said gutter pipe, and wherein a third radius of curvature of a second curvilinear outer surface corresponding to said second upper arm section is equivalent to said second radius of curvature corresponding to said gutter pipe.

4. The gutter assembly of claim 2, wherein said first upper arm section is angled outwards, and wherein said second upper arm section is angled outwards.

5. The gutter assembly of claim 4, wherein said first upper arm section is set at an angle of approximately 30 degrees relative to a first gutter cap mounting surface, wherein said first gutter cap mounting surface rests on said first mounting ledge when said gutter cap is attached to said gutter pipe, wherein said second upper arm section is set at an angle of approximately 30 degrees relative to a second gutter cap mounting surface, wherein said second gutter cap mounting surface rests on second first mounting ledge when said gutter cap is attached to said gutter pipe.

6. The gutter assembly of claim 2, wherein said first lower arm section is angled inwards, and wherein said second lower arm section is angled inwards.

7. The gutter assembly of claim 6, wherein said first lower arm section is set at an angle of approximately 20 degrees relative to vertical, and wherein said second lower arm section is set at an angle of approximately 20 degrees relative to vertical.

8. The gutter assembly of claim 1, wherein said gutter pipe is cylindrical prior to removal of said upper portion of said gutter pipe.

9. The gutter assembly of claim 8, wherein at least a second section of said gutter pipe remains whole and cylindrical.

10. The gutter assembly of claim 9, wherein said second section of said gutter pipe is located at an end portion of said gutter pipe.

11. The gutter assembly of claim 1, said gutter pipe fabricated from a plastic material selected from the group consisting of polyethylene, polypropylene, polyvinyl chloride, polytetrafluoroethylene, and acrylonitrile butadiene styrene.

12. The gutter assembly of claim 11, wherein said plastic material is opaque.

13. The gutter assembly of claim 11, wherein said plastic material is white.

14. The gutter assembly of claim 1, said gutter cap fabricated from a plastic material selected from the group consisting of polyethylene, polypropylene, polyvinyl chloride, polytetrafluoroethylene, and acrylonitrile butadiene styrene.

15. The gutter assembly of claim 14, wherein said plastic material is opaque.

16. The gutter assembly of claim 14, wherein said plastic material is white.

* * * * *